United States Patent
Nash et al.

(10) Patent No.: US 10,545,968 B2
(45) Date of Patent: Jan. 28, 2020

(54) SELECTIVE PRESENTATION OF DATA ITEMS

(71) Applicant: PayPal, Inc., San Jose, CA (US)

(72) Inventors: Adam Nash, Sunnyvale, CA (US); Petra Gross, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1050 days.

(21) Appl. No.: 14/929,849

(22) Filed: Nov. 2, 2015

(65) Prior Publication Data

US 2016/0117330 A1 Apr. 28, 2016

Related U.S. Application Data

(63) Continuation of application No. 11/701,315, filed on Jan. 31, 2007, now Pat. No. 9,177,054.

(51) Int. Cl.
*G06Q 30/02* (2012.01)
*G06F 16/2457* (2019.01)
*G06F 16/951* (2019.01)
*G06F 3/0485* (2013.01)

(52) U.S. Cl.
CPC ...... *G06F 16/24578* (2019.01); *G06F 3/0485* (2013.01); *G06F 16/951* (2019.01); *G06Q 30/02* (2013.01); *G06Q 30/0225* (2013.01); *G06Q 30/0241* (2013.01); *G06Q 30/0256* (2013.01); *G06Q 30/0273* (2013.01); *G06Q 30/0275* (2013.01); *G06Q 30/0277* (2013.01)

(58) Field of Classification Search
CPC ...................................................... G06Q 30/02
USPC ....................................... 705/37, 14.66, 26.1
See application file for complete search history.

(56) References Cited

U.S. PATENT DOCUMENTS

| | | | |
|---|---|---|---|
| 6,185,558 B1 * | 2/2001 | Bowman ........... | G06F 17/30646 705/37 |
| 2004/0267561 A1 * | 12/2004 | Meshkin ................ | G06Q 30/02 705/26.1 |
| 2006/0282328 A1 * | 12/2006 | Gerace .............. | G06F 17/30867 705/14.66 |

* cited by examiner

*Primary Examiner* — Marilyn G Macasiano
(74) *Attorney, Agent, or Firm* — Maschoff Brennan

(57) ABSTRACT

A method includes identifying a plurality of data items responsive to a first query. A presentation value associated with each of the plurality of data items is determined, the presentation value of a respective data item being a value associated with the respective data item by a first user in exchange for the presentation of the data item by a publication system. The plurality of data items are ranked for presentation to a second user, the ranking being performed using the respective presentation values associated with the plurality of data items.

20 Claims, 12 Drawing Sheets

SELECTIVE PRESENTATION OF DATA ITEMS

RELATED APPLICATIONS

This application is a continuation of and claims the benefit of priority to U.S. patent application Ser. No. 11/701,315, filed on Jan. 31, 2007, which is hereby incorporated by reference herein in its entirety.

TECHNICAL FIELD

The present disclosure relates generally to the technical field of data publication and, in one example embodiment, to the selective publication of data items.

BACKGROUND

Publication systems, such as online advertiser Google, Inc. and an online marketplace eBay Inc., deploy technology to selectively publish data items (e.g., online advertisements, marketplace listings etc.). Depending on various criteria, which include relevancy, these online publishers are continually faced with the technical challenge regarding which data items from the body of data items available for publication, to select for publication. For example, considering an online advertiser, the online advertiser typically has a body of advertisements that are available for publication. One popular method of selecting which advertisements to publish is to utilize keywords, selected from content being presented to a user (e.g., a news story or content at a website) to select advertisements to present to a user, on the assumption the user is more likely to click through (or perform some other action responsive to) advertisements that are contextually relevant to content that the user is presently viewing. For example, Google, Inc. utilizes its AdSense technology to identify high-value keywords associated with content or search results that are currently being presented to a user. Various advertisements are associated with such keywords, and these advertisements are selected for presentation to a user depending on what an advertiser may have bid in order to have advertisements associated with the relevant keyword. To this end, Google has deployed a technology known as "AdWords", which enables users to specify keywords that should trigger their advertisements, and also a maximum amount they are willing to pay "per click" (i.e., what they are willing to pay should a user click through the relevant advertisement).

Turning now to the online marketplace operated by eBay Inc., the presentation of listings within the context of the electronic marketplace is typically driven by user search criteria (e.g., a category selection, keywords, and various attribute filters etc.). eBay also has a contextual advertising tool, named eBay AdContext, which automatically scans the content of a website, and returns relevant eBay advertisement content. For example, where a website relates to sport, eBay AdContext may display advertisements for sporting good listings, or eBay search results for memorabilia related to a specific sports team. When the user clicks on the eBay advertisement, the user is lead directly to the eBay site, for example either directly to a listing, a category page, or a search result page.

Various online publishers may also offer programs whereby certain data items, presented to a user, may be highlighted or "featured" in certain way. For example, eBay Inc. offers certain promotional tools that enable users to differentiate their listings from other listings on the site. Such promotional tools may include the option to include an image of an item being sold within a virtual online image "gallery". Other promotional tools include the ability to bold text of a listing when the listing is presented as part of search results, and also to employ highlight color bands emphasizing a particular listing within a search result. Similarly, Yahoo!, Inc., within its "local" or "Yellow Pages" section, allows business owners to sign up as "sponsored" businesses, which provides premium placement for listings of such businesses above standard business listings.

BRIEF DESCRIPTION OF THE DRAWINGS

Some embodiments are illustrated by way of example and not limitation in the figures of the accompanying drawings in which.

DETAILED DESCRIPTION

Figure 1:
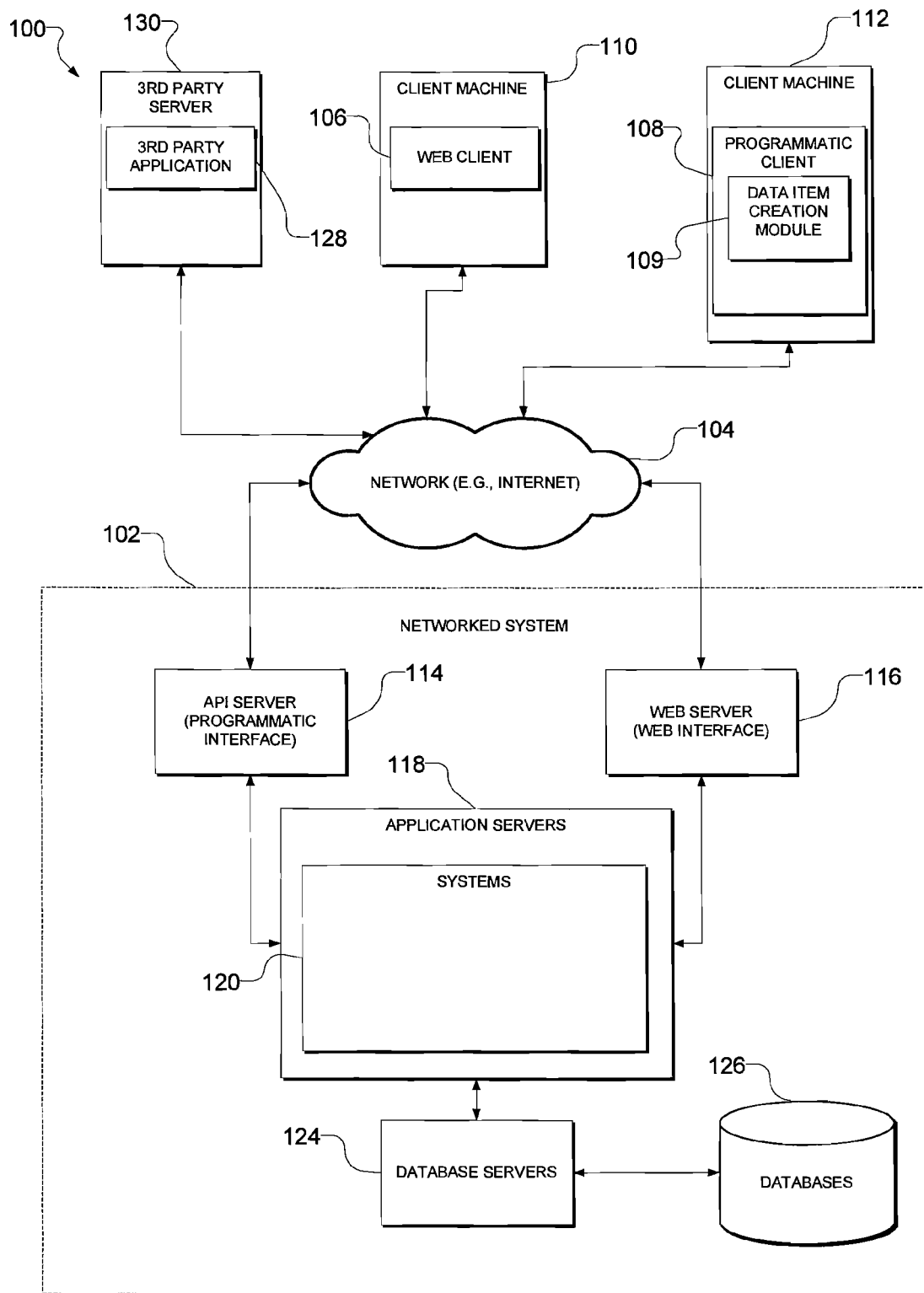
FIG. 1 is a network diagram depicting a client-server system, within which one example embodiment may be deployed.

Example methods and systems to present data items are described. In the following description, for purposes of explanation, numerous specific details are set forth in order to provide a thorough understanding of example embodiments. It will be evident, however, to one skilled in the art that the present invention may be practiced without these specific details.

According to one example embodiment, there are described systems and methodologies to enable a publishing user to offer a value (e.g., monetary payment, commitment to make a payment on the occurrence of an event or satisfaction of a condition) to a publishing system (e.g., an online search engine, a directory publisher (both online and offline), an online marketplace, or an online or offline advertiser) in order for a data item (e.g., publication information, such as an advertisement, directory listing, or marketplace listing) to be included in information presented to a user, or to be promoted or featured in a publication by such a publication system. While the below described embodiments are described within the context of an online publishing system, it will readily be appreciated that the described example technologies, systems and methods may be employed by a publishing system that publishes via other channels (e.g., print publications, television, radio etc.).

In the example system, a publication system may receive a data item (e.g., publication information) from a publishing user, and an associated value offering (e.g., an upfront payment or a success-based payment offer or commitment). A success-based payment offer, or commitment to make a payment or provide some other value, to the publication system by the publishing user may be furthermore made contingent upon certain criteria, such as the mere inclusion of the publication information in information delivered to a user (or a predetermined number of users), the featuring or promotion of the publication information in some manner, or some action (e.g., a click through, tagging, inclusion in a wish list or shopping basket, or purchase action by a user) relative to the publication information. For example, where the publication information is a listing to be published on an online marketplace, a bid may be received to feature or promote the relevant listing among listings presented by the online marketplace, for example responsive to a query received from a user.

It will be noted that, in one example embodiment, the value offering is not received in connection with the presentation of the data item with respect to any specific keywords that are selected, identified or specified by the publishing user (e.g., the value offering is not offered in connection with a keyword campaign). In one example embodiment, the presentation of the data item by the publication system may be responsive to a search query, the results of the search query being identified by the publication system based a deployed search algorithm, and as a result of the content, attributes and metadata associated with the data item itself.

According to example embodiments, a featured item may appear on soft and hard domain pages and product pages. Hard domain pages may be catalog related (e.g., Music, Movies, etc.). Featured placement on hard domain pages may feature unique items (as opposed to catalog products) that may be displayed in natural search results below the featured placement. Since the publishing system has access to the International Standard Book Number (ISBN) of the item that the publishing user has listed, it may display the "products" rather than "items" in natural search. For example, if the publishing system has 500 of the same Finding Nemo DVD listed (same ISBN), it may display the product (e.g., the Finding Nemo DVD) on the search results page with a price range indicating the lowest and the highest price the publishing users are asking for it. Buyers may then click on the product to select which publishing user they want to purchase from.

Soft-domain pages may be non-catalog related (e.g., unique items) where there is no ISBN number to identify the product, and the publishing system accordingly displays every single listing individually with its specific description and listing price.

The example systems and methods also relate to a ranking of data items to be published, promoted or featured by a publication system. Data items may then be selectively published, featured or promoted based on a relative ranking. For example, where a predetermined number of promotional vacancies or slots exist within a single presentation event (e.g., a web page), the highest ranked of the data items may be selected for those promotional vacancies utilizing the rankings attributed or assigned to such data items.

In one example embodiment, the ranking assignment to a data item may be based at least partially on the value offering (e.g., an upfront or success-based bid) provided by a publishing user for the publication, featuring or promotion of the relevant data item. In further embodiments, a number of other criteria may also be utilized in assigning a ranking to a data item. For example, a ranking algorithm, performing the ranking of the data items, may consider such factors as revenue benefit to the publishing system, as well as an expected success with respect to one or more actions, upon which payment of the value offering by the publishing user may be contingent. The revenue benefit may include, for example, the value offering (e.g. upfront fee and/or a success-based fee components) of the publishing user, as well as other revenue sources. The expected success may take into account historical "success levels" with respect to similar data items, as well as contextual relevance of the data item with respect to a specific presentation event (e.g., search results to be returned by an online marketplace, or advertisements to be served up by an advertising system).

However, commitment by a publishing user to an upfront fee or a success-based fee may not guarantee publication, featuring or promotion of a data item. In order for an item to be considered for publication, featuring or promotion, the data item and the publishing user of the item may, for example, need to be qualified. In addition, the publication, featuring or promotion of the data item may depend on the design of the featured placement. For example, fixed placement may accommodate up to 4 featured listings at any one time; while a slideshow may accommodate an unlimited number of listings.

The publishing user may be able to revise the success-based fee after submitting a listing for publication by the publishing system.

The example methods and systems may also operate to detect the occurrence of events (e.g., user actions) related to the presentation (e.g., publication, provision of access to, featuring or promotion) of data item, and charge or debit a publishing user responsive to the detection of such an event. Accordingly, in an example embodiment, a publishing user may be charged a success-based fee, with the success being determined based on any one of a number of detected events (e.g., the purchase of an item offered for sale in a data item, the detection of tagging, or addition of an item offered for sale within a data item to an electronic shopping cart or wish list, or the qualification of a lead related to an item offered for sale by data item).

Further details regarding various example embodiments are provided below. The disclosure begins by providing context for an example publication system, and then proceeds to discuss the above described technologies in further detail.

FIG. 1 is a network diagram depicting a client-server system 100, within which one example embodiment may be deployed. A networked system 102, in the example forms of a network-based marketplace or other publication system (e.g., online search system, online advertisement system, content portal or aggregator etc.), provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more systems 120. The application servers 118 are, in turn, shown to be coupled to one or more databases servers 124 that facilitate access to one or more databases 126.

The systems 120 may provide a number of functions and services to users that access the networked system 102. The system 100 shown in FIG. 1 employs a client-server architecture, the present invention is of course not limited to such an architecture, and could equally well find application in a distributed, or peer-to-peer, architecture system, for example. The systems 120 could also be implemented as standalone software programs, which do not necessarily have networking capabilities.

The web client 106 accesses the various systems 120 via the web interface supported by the web server 116. Similarly, the programmatic client 108 accesses the various services and functions provided by the systems 120 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more publication, advertisement, promotional, marketplace or payment functions that are supported by the relevant applications of the networked system 102.

Marketplace Applications

Figure 2:
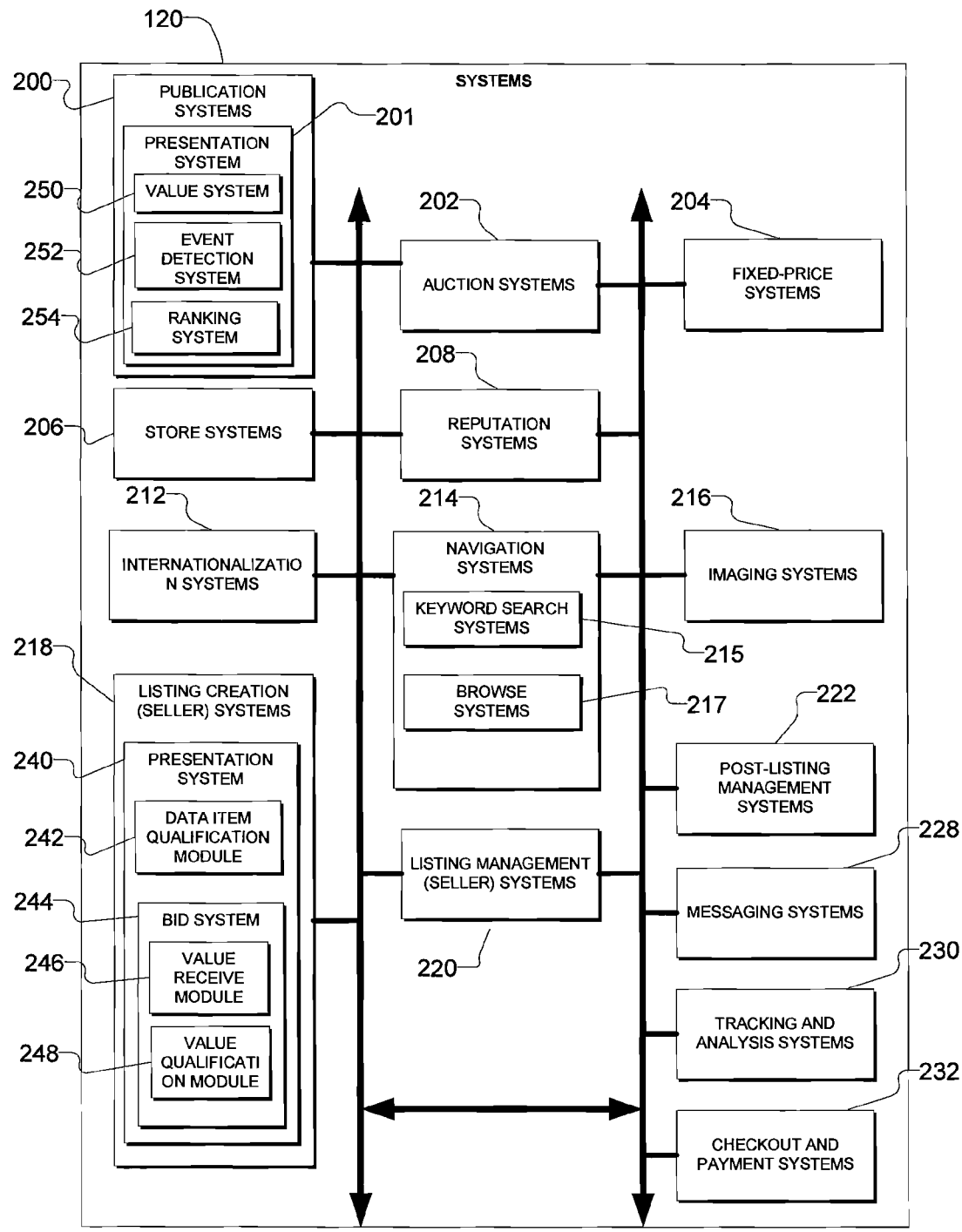
FIG. 2 is a block diagram illustrating systems that, in one example embodiment, are provided as components of the networked system.

FIG. 2 is a block diagram illustrating systems 120 that, in one example embodiment, are provided as components of the networked system 102. The systems 120 may be hosted on dedicated or shared server machines (not shown) that are communicatively coupled to enable communications between server machines. The systems 120 themselves are communicatively coupled (e.g., via appropriate interfaces) to each other and to various data sources, so as to allow information to be passed between the applications or so as to allow the applications to share and access common data. The systems 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the systems 120 are shown to include modules in the form of at least one publication system 200, which itself includes a presentation generation system 201. The presentation generation system 201 includes a value system 250, an event detection system 252, and a ranking system 256.

The systems 120, when being deployed in an online marketplace, may also include one or more auction systems 202 which support auction-format listing and price setting mechanisms (e.g., English, Dutch, Vickrey, Chinese, Double, Reverse auctions etc.). The various auction systems 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price systems 204 support fixed-price listing formats (e.g., the traditional classified advertisement-type listing or a catalogue listing) and buyout-type listings. Specifically, buyout-type listings (e.g., including the Buy-It-Now (BIN) technology of eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store systems 206 allow a seller to group listings within a "virtual" store, which may be branded and otherwise personalized by and for the seller. Such a virtual store may also offer promotions, incentives and features that are specific and personalized to a relevant seller.

Reputation systems 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation systems 208 allow a user, for example through feedback provided by other transaction partners, to establish a reputation within the networked system 102 over time. Other potential trading partners may then reference such a reputation for the purposes of assessing credibility and trustworthiness. As is explained in further detail below, reputation information may be used to qualify and listing or a value offer in connection with publication of a data item.

The networked system 102 may support a number of channels (e.g., websites) that are customized, for example, for specific geographic regions. A version of the networked system 102 may be customized for the United Kingdom, whereas another version of the networked system 102 may be customized for the United States. Each of these versions may operate as an independent channel, or may be customized (or internationalized) presentations of a common underlying channel. The networked system 102 may accordingly include a number of internationalization systems 212 that customize information (and/or the presentation of information) by the networked system 102 according to predetermined criteria (e.g., geographic, demographic or marketplace criteria). For example, the internationalization systems 212 may be used to support the customization of information for a number of regional websites that are operated by the networked system 102 and that are accessible via respective web servers 116.

Navigation of the networked system 102 may be facilitated by one or more navigation systems 214. For example, a keyword search system 215 (as an example of a navigation system) may enable key word searches of listings published via the networked system 102. A browse search system 217 may allow users to browse various category, catalogue, or inventory data structures according to which listings may be classified within the networked system 102. Various other navigation applications may be provided to supplement the search and browsing applications.

In order to make data items (e.g., advertisements, listings and other publication information) available via the networked system 102, as visually informing and attractive as possible, the systems 120 may include one or more imaging systems 216 utilizing which users may upload images for inclusion within data items. An imaging system 216 also operates to incorporate images within viewed data items. The imaging systems 216 may also support one or more promotional features, such as image galleries and other visual differentiators that are presented to potential buyers. For example, sellers may pay an additional fee to have an image included within a gallery of images for promoted items.

Data item creation systems 218 allow sellers conveniently to author data items, for example a listings pertaining to goods or services that they wish to transact via the networked system 102, and includes a presentation creation system 240, which in turn includes a qualification system 242, and a bid system 244. The bid system 244 includes a value receive system 246 and a value qualification system 248). The functions of these various systems and modules as described in further detail below with reference to a number of flowcharts.

Data item management systems 220 allow sellers to manage such data items. Specifically, where a particular seller has authored and/or published a large number of listings, the management of such listings may present a challenge. The data item management systems 220 provide a number of features (e.g., auto-relisting, inventory level monitors, etc.) to assist the seller in managing such listings. One or more post-listing management systems 222 also assist sellers with a number of activities that typically occur post-listing. For example, upon completion of an auction facilitated by one or more auction systems 202, a seller may wish to leave feedback regarding a particular buyer. To this end, a post-listing management system 222 may provide an interface to one or more reputation systems 208, so as to allow the seller conveniently to provide feedback regarding multiple buyers to the reputation systems 208.

Messaging systems 228 are responsible for the generation and delivery of messages to users of the networked system 102, such messages for example advising users regarding the status of data items at the networked system 102. Respective messaging systems 228 may utilize any one have a number of message delivery networks and platforms to deliver messages to users. For example, messaging systems 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

A tracking and analysis system 230 gathers information regarding user activities on, and interactions with the systems 120. For example, the system 230 may capture and analyze user behavior on the networked system 102 by recording "click streams" and "conversion" events (e.g., click troughs and purchase events). This captured information may then be analyzed to reveal and detect trends in such user interactions. The system 230 may further capture historical data regarding users (e.g., interactions with the networked system 102) on an individual or general aggregated level.

A checkout and payment system 232 allows users to make purchase items (e.g., data items or items described by such data items) by making payments to an operator of the networked system 102 or to other user of the networked system 102.

Figures 3, 4:
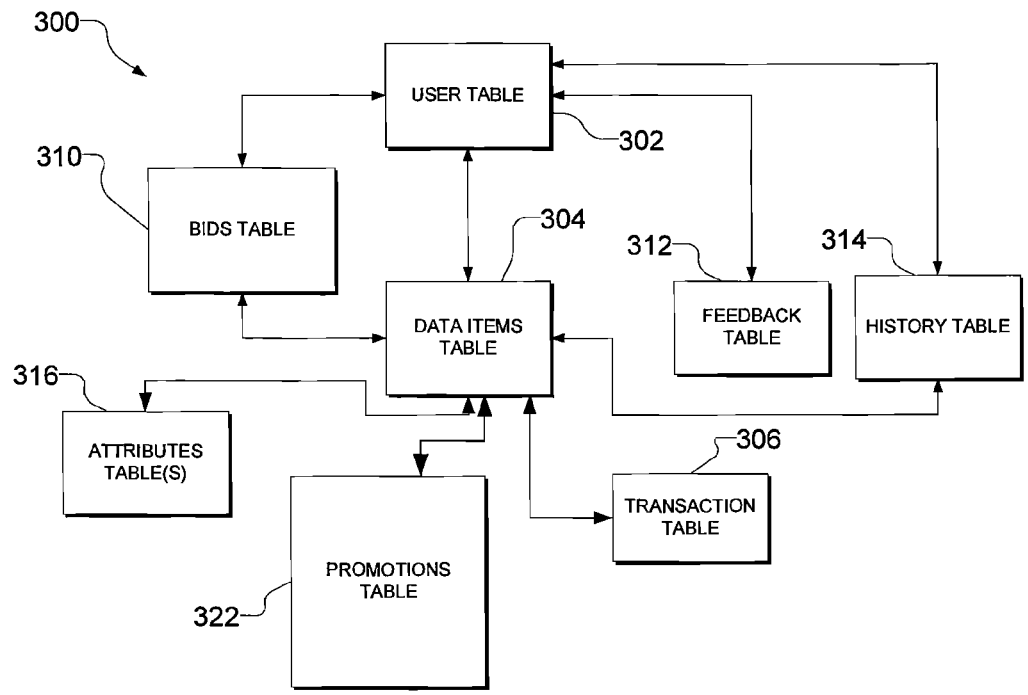
FIG. 3 is a high-level entity-relationship diagram, illustrating various tables that may be maintained within a database, and that are utilized by and support an example system.
FIG. 4 is a table diagram illustrating a table, according to an example embodiment, that may be maintained within a database.

FIG. 3 is a high-level entity-relationship diagram, illustrating various tables 300 that may be maintained within the databases 126, and that are utilized by and support the systems 120. A user table 302 contains a record for each registered user of the networked system 102, and may include identifier, address and financial instrument information pertaining to each such registered user. A user may operate as a viewer, service consumer, seller, or a buyer within the networked system 102, for example. In one example embodiment, a buyer user may be a user that has accumulated value (e.g., commercial or proprietary currency), and is accordingly able to exchange the accumulated value for items that are offered for sale by the networked system 102.

The tables 300 also include an items table 304 in which are maintained item records for data items to be published by the network system 120. In one example embodiment, these data items may describe goods and services that are available to be, or have been, transacted via the networked system 102. Each item record within the items table 304 may furthermore be linked to one or more user records within the user table 302, so as to associate a publishing user (e.g. an advertiser or a seller) and one or more actual or potential buyers with each item record.

A transaction table 306 contains a record for each transaction (e.g., a purchase or sale transaction) pertaining to items for which records exist within the items table 304.

In an embodiment in which the networked system 102 is an online marketplace, bid records within a bids table 310 each relate to a bid received at the networked system 102 in connection with an auction-format listing supported by an auction system 202. A feedback table 312 is utilized by one or more reputation systems 208, in one example embodiment, to construct and maintain reputation information concerning users. A history table 314 maintains a history of transactions to which a user has been a party, and may partially be updated by the tracking and analysis system 230. One or more attributes tables 316 record attribute information pertaining to items for which records exist within the items table 304. Considering only a single example of such an attribute, the attributes tables 316 may indicate a currency attribute associated with a particular item, the currency attribute identifying the currency of a price for the relevant item as specified in by a seller. The attributes table 316 may also be used to implement a hierarchical category structure maintained by the networked system 120 to classify and categorize data items that are published. As such, a category identifier may be regarded as an attribute that can be associated with a particular listing.

An items promotions table 322, which is shown in greater detail in FIG. 4, includes a list of promotions that may have been associated with a data item in the data items table 304. To this end, the promotions table 322 may maintain a record for each promotion (e.g., a feature promotion, a "bold"

promotion etc.) including a promotion identifier 402, as shown in FIG. 4. The promotions table 322 may also record a success-based fee 404 and/or an upfront fee 406 offered (e.g. bid) or paid by a publishing user in order to have the relevant promotion applied with respect to a specific data item. In an alternative embodiment, the fees 404 and 406 may be maintained within the data items table 304.

While an example embodiment shall be described herein with certain references to an online marketplace, in which a data item to be published is a listing, it will be appreciated that the described technology may be deployed with respect to any one of a number of types of publication systems, and also may involve any one of a number of types of data items, such as advertisements, directory listings, other alphanumeric data, video data, image data, and audio data. Further, while an example presentation discussed below in the example embodiment is a "featured" or other promotional presentation of a data item, it should be understood that the disclosed technology may be utilized in conjunction with any presentation (e.g., a simple publication etc.).

Figure 5:
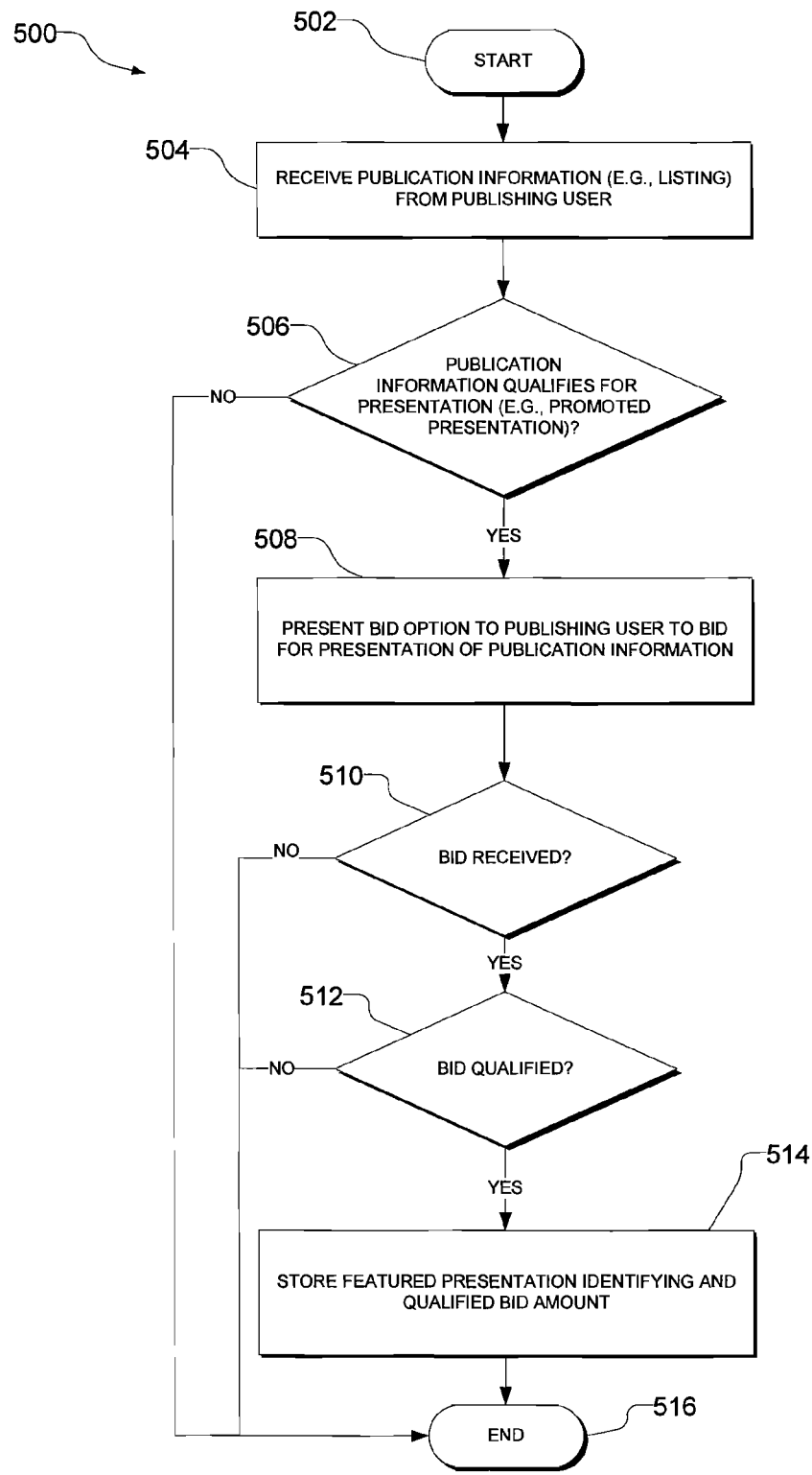
FIG. 5 is a flowchart illustrating a method, according to an example embodiment, to receive a data item, in the example form of publication information compromising a listing, and an associated value offering, at a publication system.

FIG. 5 is a flowchart illustrating a method 500, according to an example embodiment, to receive a data item, in the example form of publication information compromising a listing, and an associated value offering, at a publication system. The method commences at 502, and proceeds to operation 504 with the receipt of the publication information, from a publishing user, at the publishing system. In one example embodiment, the publication information may be received via a web server 116, where a publishing user has inputted the publication information into a web interface displayed by a web client 106 executing on a client machine 110. In this case, a data item creation system 218 may interface with the web server 116 in order to generate an appropriate interface (e.g., a listing creation interface) into which the publishing user can conveniently input the publication information.

In another embodiment, the publication information may be received at a data item creation system 218 via a programmatic interface provided by an API server 114. In this example scenario, a programmatic client 108, and specifically a data item creation module 109 of the programmatic client 108, executing on the client machine 112 may be used by the publishing user in order to generate the publication information.

In yet a further example scenario, the publication information may be received from a third party application 128, for example executing on a third party server 130, which has access to third party databases in which the publication information may be stored.

In the case of an online marketplace, the publication information may be received in the form of a listing, which is authored as part of a listing creation flow generated by the data item creation system 218.

At operation 506, a determination may be made by the qualification system 242 of the presentation system 240 regarding whether the publication information qualifies for presentation (e.g., publication, or featured or promotional presentation). The qualification system 242 may determine whether the data is of the type that may be presented. For example, certain fields required for publication may be absent from the publication information, in which case the publication information would fail the qualification at operation 506, and the method 500 would then terminate at operation 516. Another determination that may be made at decision operation 506 is whether the publishing user (e.g., seller) qualifies to have the publication information presented. For example, it may be that the prospective publishing user is in arrears with respect to an account held at the publication system. Further, in the example of online marketplace, the reputation of the prospective publishing user may be such that the publishing user is disqualified from presenting publication information.

In one further example, the presentation may be via a specific presentation channel (e.g., on one website of a number of websites operated by a publishing system). In this case, the determination may be whether the publication information qualifies for presentation via a channel (e.g., specific website) selected by the publishing user. To this end, the qualification system 242 may have access to requirements for each of the multiple publication channels, and may compare the publication information against those requirements in order to determine whether the publication information is qualified or not.

The qualification may furthermore be with respect to the publication information itself (e.g., determination as to whether the publication information includes all components and fields required for publication), and also may comprise a qualification of the subject matter of the publication information (e.g., is the publication information appropriate generally, or is the publication information appropriate for a specific channel by which the publishing user may want the publication information to be presented).

Assuming the publication information is successfully qualified as operation 506, at operation 508 a receive system 246 of the bid system 244 presents, via an appropriate interface (e.g., a programmatic interface 114 or web interface 116), a value presentation option, to the publishing user. The value presentation option may be a success-based fee bid option that can be exercised to bid for presentation (e.g., publication, featured or promoted presentation) of the publication information. The value may also be an upfront fee that can be paid for presentation.

Figure 6:
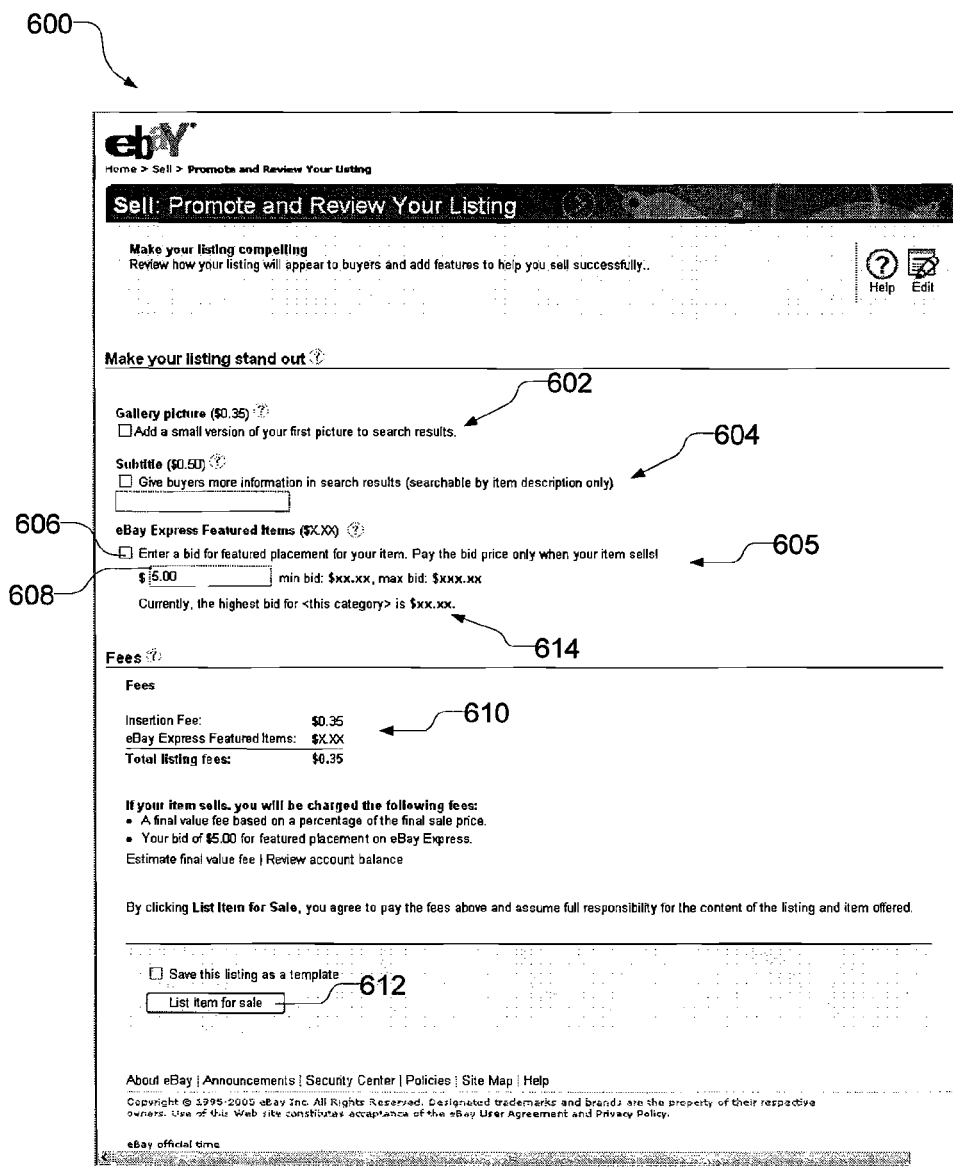
FIG. 6 is a user interface diagram illustrating an example "promotional listing" interface, according to an example embodiment, that may be presented to a user of an online marketplace.

FIG. 6 is a user interface diagram illustrating an example "promotional listing" interface 600, according to an example embodiment, that may be presented to a user of an online marketplace at operation 508. As is apparent from FIG. 6, the interface 600 may present a number of featured presentation options for an upfront fee (e.g., the "gallery picture" promotion 602 or the "subtitle" promotion 604). The interface 600 is then also shown to present a featured or promoted presentation option, designated generally at 605 and in the form of a "featured items" presentation. The option 605 is presented with a checkbox 606 that is user selectable to enter a success-based fee bid for a featured placement of a listing, and also a bid value input field 608, in which the user may input a bid value. The interface 600 then also includes a fees section, designated generally at 610, which provides a fee total for selected promotional feature or presentation options, and a "list item for sale" button 612, which is user selectable to publish a listing, as an example a publication of information, on an online marketplace.

The interface 600 may also include a bid guide 614 to assist a user in deciding what bid price to offer for featured placement of an item in an identified category.

In an example embodiment, the publishing system may provide bulk edit/revise tools to facilitate applying a fee or bid in bulk, to a group of listings.

Returning to the featured item presentation option 605, it will be noted that the publishing user is advised that the bid price will only be due and payable if and when an item, which is offered for sale in the publication information, actually sells. This is an example of a success-based payment and pricing option that may be deployed. However, as will be further discussed below, a number of other pricing and payment schemes may also be deployed.

Accordingly, with reference to FIG. 6, in addition to receiving a bid value via the option 605, the publication system may also receive a publication value (e.g., an upfront fee) for the publication of the publication information, or for a featured presentation of the publication information.

In other embodiments, the fee structure for the presentation may include an upfront fee component that is charged at the time of the listing, and a success-based fee component, which is only charged on the occurrence of certain event (e.g. performance of an action by a viewing user) related to the publication information. Accordingly, in various embodiments, combinations of a flat fee component and the success fee component may be charged in connection with the presentation of the publication information.

From the above, it will be apparent that the bid may be in anticipation of a presentation of the publication information. In a further example embodiment, such as that illustrated in FIG. 6, the bid may be in anticipation of a presentation (e.g., featured presentation) of the publication information and in anticipation of an action relating to the data item (e.g., sale of an item offered for sale in the publication information). In further embodiments, further conditions may be attached to when a success-based fee would be debited to a publishing user. For example, the success-based fee may only become payable if an item offered for sale sells within a predetermined time, or at a specified profit margin etc.

At decision operation 510, the value receive system 246 will determine whether a value offered for a presentation of publication information has been received. If so, the method 500 advances to operation 512, where the value qualification system 248 makes a determination as to whether the bid qualifies as a valid bid.

The qualification of the bid, prior to acceptance of the bid by the value qualification system 246, may include determining whether the publishing user qualifies to submit the bid for presentation of the data item. For example, various additional criteria, over and beyond those applied when qualifying the publication information at operation 506 may be applied. Specifically, a publishing history of the publishing user may be subject to various checks and criterions, and the financial reputation and health of the publishing user may also be subject to various checks and qualifications.

The qualifying of the bid at operation 512 may also include determining whether a submitted bid value falls within a qualified bid value range. In one example, where the publication system maintains a category structure, and the publication information is categorized for publication within a particular category of this structure, the determination at operation 512 may include determining a category specific qualified bid range value for a category in which the publication information will be published. For example, again considering the example of an online marketplace, where the publication information is a listing offering a vintage motor vehicle for sale, the "vintage cars" category may have certain minimum and maximum bid values associated therewith, and the qualifying determination may be whether the bid provided by the publishing user falls within the category specific range.

The specification of minimum and maximum bid values per-category values may be used to exercise certain economic controls within a publication system. For example, a minimum may ensure a certain level of financial commitment by the seller, and to ensure that an operator of the publication system can recoup sufficient costs from sellers who participate. A maximum bid value protects an operator of the publication system from exposure to unlimited billing liability from a seller.

A further determination that may be made in qualifying the bid at operation 512 is identifying one of multiple publication channels offered by the publication system, and via which the publishing user has elected to publish the publication information. Again, considering the example where a publishing system may offer various channels for publication (e.g., multiple websites, a printed publication, an audio channel and/or a video channel), each of these channels may have a specified qualified bid value range (e.g., determined by a minimum value, a maximum value, or the combination of a minimum and maximum value).

Assuming the bid is qualified at operation 512, the method 500 progresses to operation 514, where a presentation identifier (e.g., the promotions identifier 402) and a qualifying bid amount (e.g., the success-based bid value 404) may be stored in a database associated with the publication system (e.g., in the table 400 of the database structure 300, as illustrated in FIGS. 3 and 4).

Should the bid not be received at operation 510, should the bid be disqualified at operation 512, or should operation 514 complete, the method 500 then progresses to the terminated operation 516, where the method 500 terminates.

Figure 7:
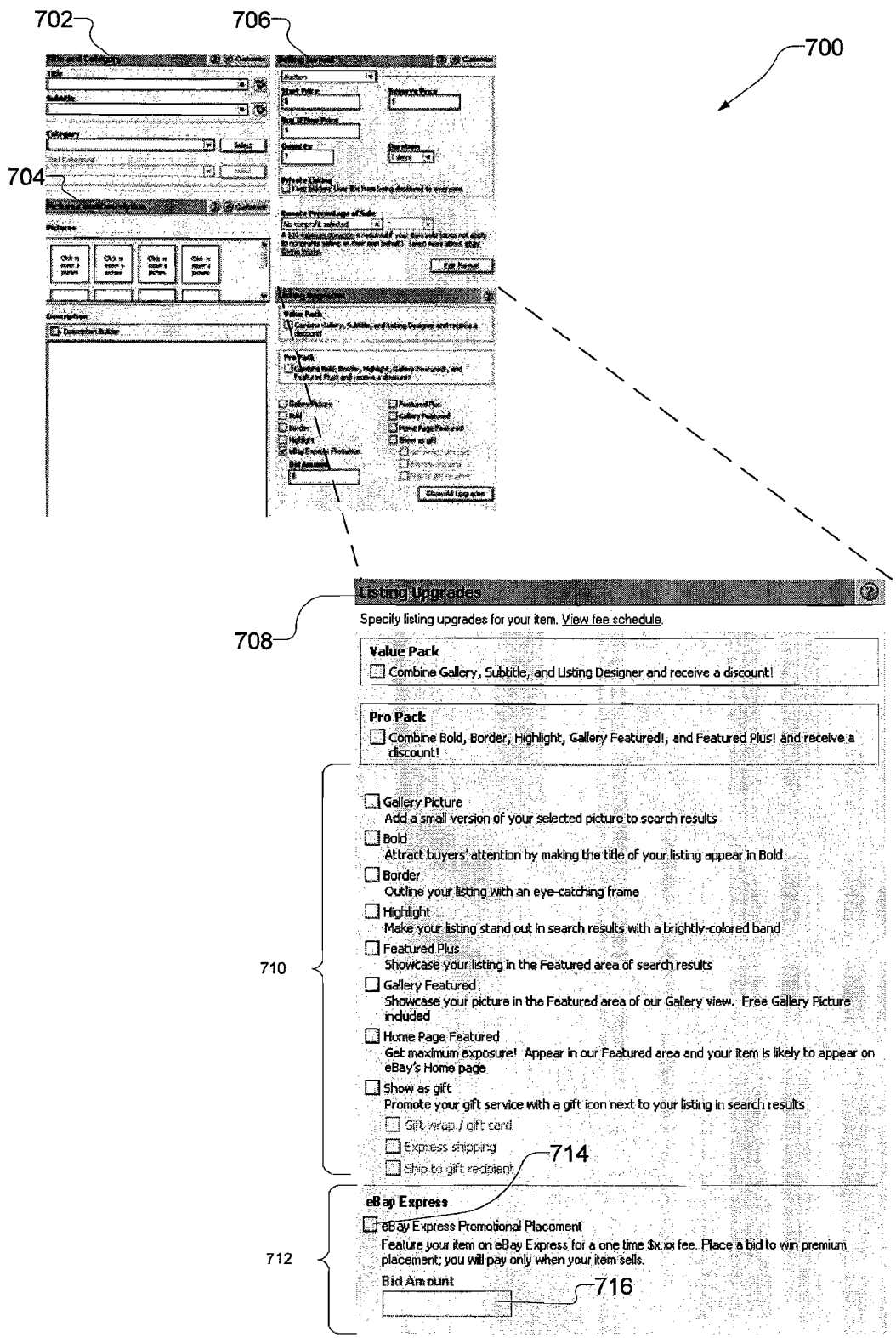
FIG. 7 shows a further example embodiment of a publication information interface, according to an example embodiment.

FIG. 7 shows a further example embodiment of a publication information interface 700, according to an example embodiment, that may be presented at operations 504 and 508. In this example by the data item creation module 109 of a programmatic client 108 (e.g., the eBay Turbo Lister product) is used to solicit the publication information and to present the bid option to a publishing user.

The publication interface 700 includes a "title and category" portion 702, a "picture and description" portion 704, and a "selling format" portion 706, into which a publishing user may input various information types in order to compose a data item (e.g., a listing for a publication by a publication system operated by an online marketplace). The interface 700 also includes a "listings upgrade" portion 708, which presents a number of presentation enhancement options that are selectable by the user to "upgrade" a listing, and distinguish and make the listing more visible on the online marketplace. Specifically, a number of upfront fee options are shown at 710, with a success-based fee option (e.g., the "promotional placement" option) being shown at 712. The option 712 includes a checkbox 714 that is user selectable to indicate selection of the success-fee based option, and also includes a bid amount field 716 into which the publishing user may input a bid amount for the relevant promotional placement.

Figure 8:
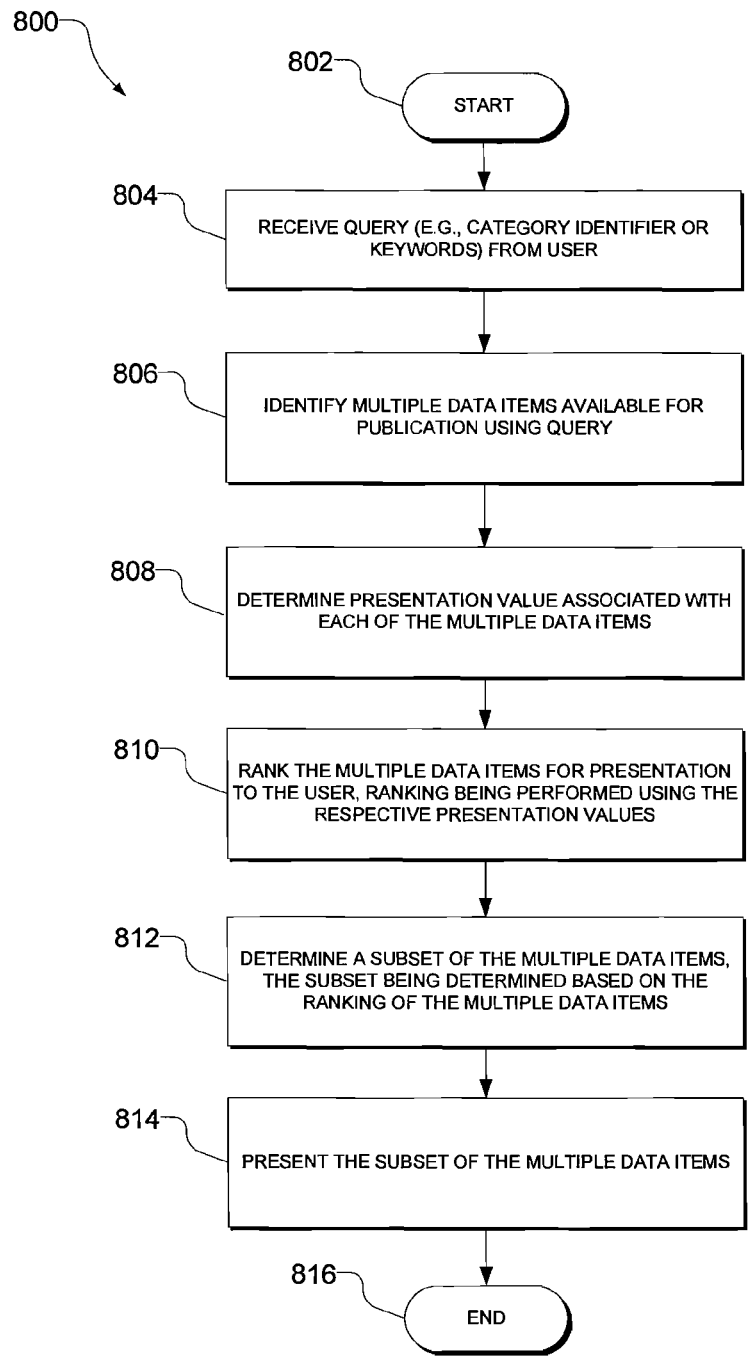
FIG. 8 is a flowchart illustrating a method, according to example embodiment, to selectively present data items.

FIG. 8 is a flowchart illustrating a method 800, according to example embodiment, to selectively present data items. The method 800 commences at 802, and progresses to operation 804 with the receipt of a query, from a user, at a publication system, the query to view data items published by the publication system. For example, the query may be received by the navigation system 214, and may be directed to either a keyword search system 215 or a browse search system 217, depending upon the nature of the query. For example, where the publication system maintains a category structure into which data items are categorized, the query received at operation 804 may be a category identifier, in which case the category identifier would be processed by the browse search system 217. On the other hand, the query may be one or more keywords, in which case the query may be handled by the keyword search system 215.

In other embodiments, the query may in fact not be user inputted, but may be derived from other content that a user is viewing. Consider the example of an advertisement system, where the advertisement system receives a collection of keywords automatically extracted from, or identified based on, content (e.g., alphanumeric, image, video or audio content) that the user is viewing. In such an example, the query may be a collection of keywords (or other identifiers) to be used in a query of an advertisement database that may be maintained by the advertisement system.

In a further embodiment, the query received at operation 804 may be automatically derived from the search results of a second query received from a user. Consider the example where the publication system is part of a search engine. In this case, keywords may be extracted from the search results generated responsive to a query received from a user, and these keywords then may be utilized as the query that is received at operation 804.

At operation 806, the publication system proceeds to identify multiple data items available for publication. The identifying all these multiple data items may be performed based on information included in a query received at operation 804. Specifically, the navigation modules may identify multiple instances of publication data maintained within a database 126 of a near to it publication system 102.

In one embodiment, the identification of the data items available for a publication may include identifying a number of data items that are available for featured presentation, for example on an online marketplace or directory publication. Accordingly, this would comprise of application, by the navigation systems 214, of both the query received at operation 804 and an indication of whether a particular data item had been elected, by the publication user, as a featured presentation. Again, considering the example data structures shown in FIGS. 3 and 4, the navigation system 214 may firstly identify a number of listings from the data items table 304 that satisfy the query, and then, by examining the promotions table 322, may determine which of those listings had been selected for "featured presentation" by the publishing user (e.g., for a particular feature, which of the listings were associated with the relevant promotions identifier 402).

At operation 808, a value system 250 of the data item creation system 218 may determine a presentation value associated with each of the data items identified at operation 806. The identified presentation value, as indicated above, may be an upfront fee paid by the publishing user, or maybe a success-based fee (e.g., a bid) submitted by the publishing user in connection with a particular presentation option (e.g., the featured presentation option). In an example embodiment, the bid value 404 associated with a "featured presentation" promotion may be determined for each of the multiple data items at operation 808.

At operation 810, the identified data items are ranked, the ranking being performed, in one embodiment, at least partially based on the respective presentation values. In one embodiment, the presentation values (e.g., the upfront fees or the success-based fees) may be utilized alone in order to rank the multiple data items. Accordingly, a data item for which a publishing user had offered or paid a greater amount for the relevant presentation (e.g., a promotional presentation) would be ranked higher and then one in which the publishing user had offered or paid a lower amount.

In a further embodiment, to be described below, the presentation value may be utilized in a formula that assigns a ranking value to each of the multiple data items based, at least partially, on the presentation value received from the publishing user.

For example, other factors that may be applied in conjunction with the presentation value in ranking the multiple data items may include an "expected success", where the presentation value is success-based. For example, where the "success" for the success-based fee is a particular action, a likelihood of the occurrence of that particular activity may be calculated, for example based on historical data gathered by an operator of the publication system.

Having ranked the multiple data items at operation 810, at operation 812, a subset of the multiple data items is identified based on the ranking. A top-ranked predetermined number of data items may be determined and identified. The number of data items included in the subset may be determined in accordance with a number of available presentation opportunities (e.g., within a single presentation event). For example, where a predetermined number of "featured" promotional slots are available on a webpage, the number of available slots may determine the size of the subset. Of course, it may be that, in a specific instance, that the number of available data items is less than the number of available presentation opportunities, in which case the subset may include all of the multiple data items identified at operation 806. In another example scenario, where the publication system forms part of an advertising system, the size of the subset may be determined by certain relevancy criteria, in addition to a number of advertising opportunities or "slots" available, for example within a single presentation event.

Moving on to operation 814, the subset of the multiple data items may then be presented (e.g., published, promotionally featured etc.). In one embodiment, the presentation of the subset of data items may be made to a second, viewing user, and the presentation of the subset may be to the exclusion of data items not included in the subset. In one embodiment, where the presentation includes a promotional featuring of the data items (e.g., listings on an online market place), the data items may be visually distinguished from the presentation of other data items in a single presentation event (e.g., from other listings presented on a single webpage or when presented in a search result set). The promotional presentation may, for example, be a "featured" presentation of the subset, relative to the presentation of other subsets.

The presentation that occurs at operation 814 may not require a presentation of the full data item, but may be presentation of only a portion of each of the data items in the subset. For example, where the data item comprises a listing, the presentation may be a presentation of only a title, price etc. of the listing, and not the full description and ancillary information that is included in the listing.

Following the presentation at operation 814, the method 800 terminates at operation 816.

Figure 9:
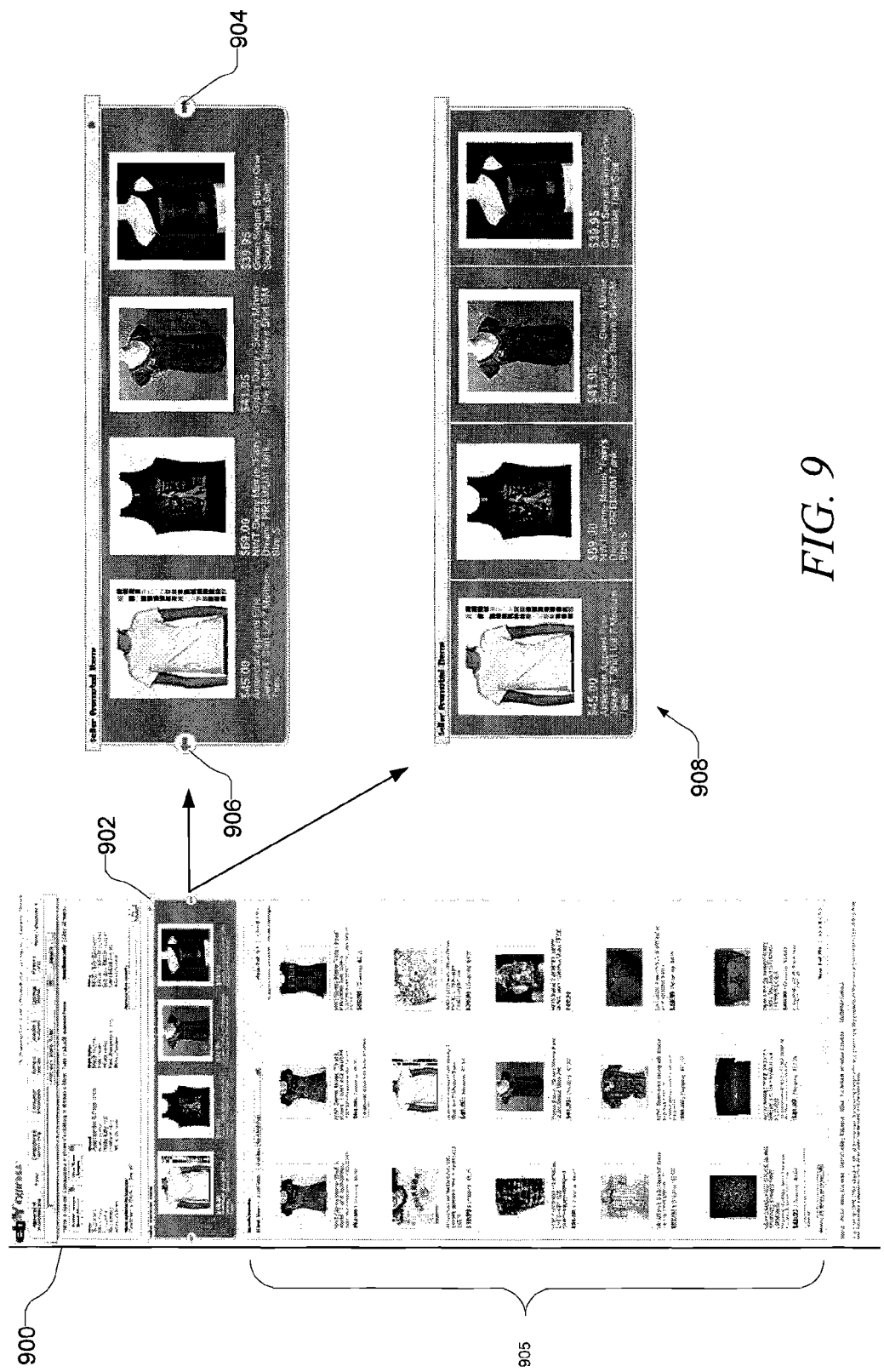
FIG. 9 is a user interface diagram illustrating a search result user interface, according to an example embodiment, which presents, to a user, search results located based on a search query submitted by the user.

FIG. 9 is a user interface diagram illustrating a search result user interface 900, according to an example embodiment, which presents, to a user, search results located based on a search query submitted by the user. The search results user interface 900 is shown to include a "featured items" portion 902, as well as a relevancy-sorted result presentation portion 905. As shown in one embodiment, the featured items portion 902 contains a predetermined number of slots (e.g., four slots), each of which is populated with data from an underlying listing. In one embodiment, the featured items portion 902 may comprise a "slide show", with directional buttons 904 and 906, which are user selectable to move the "slide show" in either a left or right direction in order to enable the inclusion of a larger number of items within the featured items portion. Accordingly, the listings included within the featured items portion constitute a subset of the listings which may be displayed in the relevancy-sorted portion 905 of the search result interface 900. It should also be noted that the listings included in the featured items portion 902 are visually distinguished (e.g., by a different background coloring, and by being placed near the top of the search result interface 900) from the listings included in the portion 905 of the search result interface 900.

FIG. 9 also shows a second embodiment of the featured items portion 908, in which the display is not movable or rotatable, as in the case of the "slide show" embodiment, and accordingly only allows a viewing user to view the subset. In the "slide show" embodiment, potentially all data items for which publishing users have committed a presentation feature may be included in the "slide show", but those which were determined at operation 810 to have the highest ranking, would be included in a "subset" that is included in an initial slide show screen, and those with a lower ranking would be located downstream in the slideshow. Accordingly, a user would have to scroll through a number of sets of featured item listings in order to view these lower-ranked listings.

Figure 10:
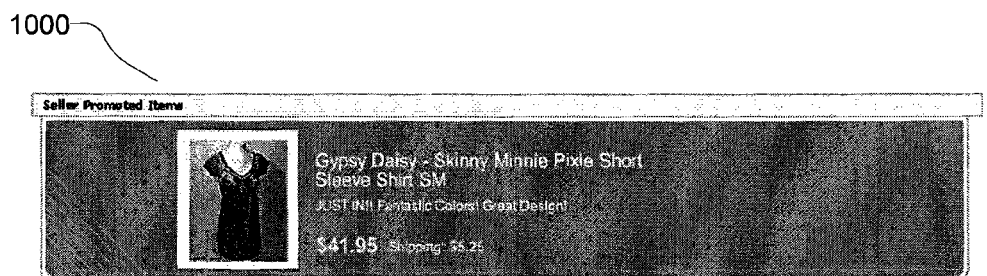
FIGS. 10 and 11 are user interface diagrams illustrating further example displays of the featured items portion.
Figure 11:
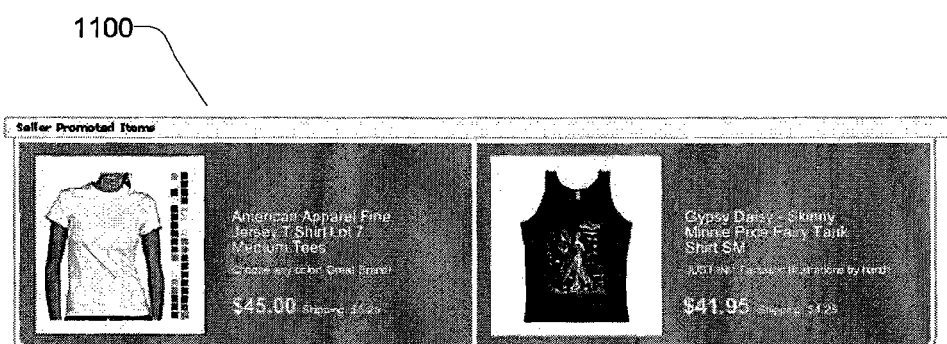

FIG. 10 illustrates a further example display of the featured items portion 1000, in which only a single "featured item" listing was identified for presentation. In this case, it will be noted that the relevant listing is expanded to occupy the entire featured items portion 1000. This should be compared to the featured items portion 1100 shown in FIG. 11, in which two "featured item" listings were identified, and the "real estate" of the featured items portion is equally divided among the two listings. Accordingly, where a predetermined number of slots are available within a promotional region or portion of a user interface, but a lesser number of promotional presentations are identified to occupy those slots, the relevant data items (or portions of the data items) may be expanded to occupy the entire display area reserved for promotional presentations.

For example, by providing proportionally more real estate to "early" bidders, the incentive to participate increases in correlation to the need of the publication system for more bidders. Unlike a linear design, this example ensures that the highest incentive possible is provided for the "first bidder", proportionally less for the "second bidder", etc, until the publication system establishes liquidity. Liquidity may be beneficial for optimum economics and ranking.

Figure 12:
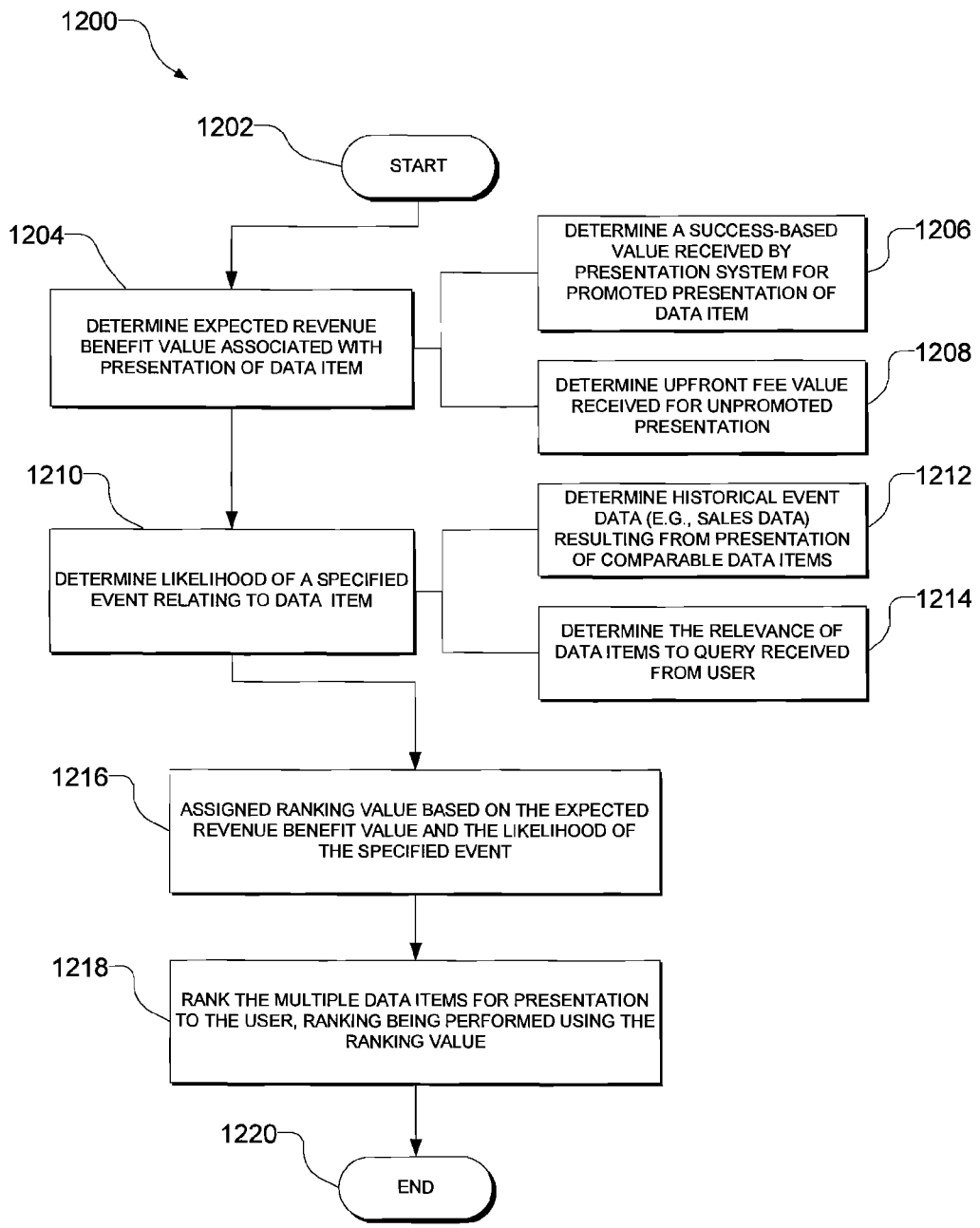
FIG. 12 is a flowchart illustrating a method, according to an example embodiment, to assign ranking values to multiple data items for presentation by a publication system.

FIG. 12 is a flowchart illustrating a method 1200, according to an example embodiment, to assign ranking values to multiple data items for presentation by a publication system. In one embodiment, the method 1200 may be performed as part of the ranking operation performed at operation 810, as described above with reference to FIG. 8. Specifically, the method 1200 may, in one embodiment, be performed by a ranking system 254, included within a presentation system 240.

The method 1200 commences at 1202, and progresses to operation 1204 with a determination by the ranking system 254 of an expected revenue benefit value, to a publication system, associated with a presentation of the data item. This determination of the expected revenue benefit to publication system may include, for example, at operation 1206 determining a success-based value (or value commitment) received by the publication system for a presentation (e.g., a publication or promotional presentation) of a data item. This determination may for example comprise determining a success-based bid value 404 stored within a promotions table 322. As mentioned above, the "success" associated with the presentation of the data item may be any one of a number of actions (e.g., a user action that flows from the presentation of the data item, such as clicking through an online advertisement (Cost-Per-Click) or purchasing an advertised item (Cost-Per-Action))

The determination of the expected revenue benefit may also include, at operation 1208, a determination by the ranking system 254 of an upfront value (e.g., an insertion or listing fee) to be received by the publication system for a presentation of the data item. For example, this fee may be the upfront fee value 406 as stored in association with a particular feature or promotional presentation within the promotions table 322.

At operation 1210, the ranking system 254 may also make a determination regarding the likelihood of occurrence of a specified "success" event, upon which the success-based value commitment will be chargeable to the publishing user. The determination of this likelihood may be performed, for example, by various data types. For example the following data may be examined and analyzed to determine a likelihood of occurrence of a specified "success" event:

Price
shipping cost
seller reputation
keywords in title
product popularity
catalog data on the product
previous buyer behavior
previous history of this listing The determination of this likelihood of occurrence of a specified "success" event may also examining historical event data, at operation 1212 (e.g., sales data) resulting from the presentation of comparable data items. For example, items with the word "XYZ" might sell better than average, but listing with the keyword "ABC" might sell worse than average. In some categories a $500 item might be more likely to sell than a $10 item or a $10000 item.

Further, the historical conversion rates with respect to "promoted" listings for similar items may be examined and analyzed to determine a likelihood of a "success" that is measured by the sale of an item. Similarly, action (e.g., purchase) rates on promoted listings, within the context of an online marketplace may be examined too, where "purchase" is recognized as a success for which the success-based value commitment may be charged to the publishing user.

The likelihood of occurrence of a specified event relating to a data item may also include, at operation 1214, determining the relevance of a data item within the context of search results returned responsive to a query from the user. Again, considering the example of an online marketplace where a listing is featured within a featured items presentation, the relevance of that listing with respect to a query from a user may be factored into determining the likelihood of whether a "success event" will follow the promotional presentation of the listing. The relevance of the listing to the data item may be measured in any one of a number of ways. For example, a relevance algorithm that determines the ranking of items in the natural search results may produce the relevance score.

At operation 1216, the ranking system 254 then assigns a ranking value to each of multiple data items, based on the expected revenue benefit value determined at operation 1204, and the likelihood of the specified "success event"

determined at operation 1210. The ranking value may then also be stored in the promotions table 322, as indicated at 408 in FIG. 4.

In an example embodiment, the ranking system 254 may employ a ranking algorithm as follows:

$$(K1*IF+K2*FF+K3*FVF+K4*BID)*(K5*ST*K6*(S\textasciicircum 2)/(1+S\textasciicircum 2)+K7*R)$$

Where:
IF=Insertion Fees for listing
FF=All upfront feature fees for that listing
FVF=Total listing final value fee, not including feature final value fee
ST=Sell-through (e.g., sales divided by page views, for that listing)
S=Sales for that listing (e.g., quantity)
R=Relevance score
K1 . . . K7=Co-efficients The co-efficients, in the above formula, may configurable per channel (e.g., per site). The above algorithm may be re-run each time the page is refreshed.

The co-efficients of the above parameters enable normalization of the parameters and also the assigning of a weighting to each parameter. For example, an operator of the publication system may wish to remove the "Relevance Score" from the ranking algorithm by setting K7 to zero.

At operation 1218, the ranking system 254 may then rank the multiple data items for presentation (e.g., to a user, the ranking being performed utilizing the assigned ranking values). The method 1200 then terminates at operation 1220.

Figure 13:
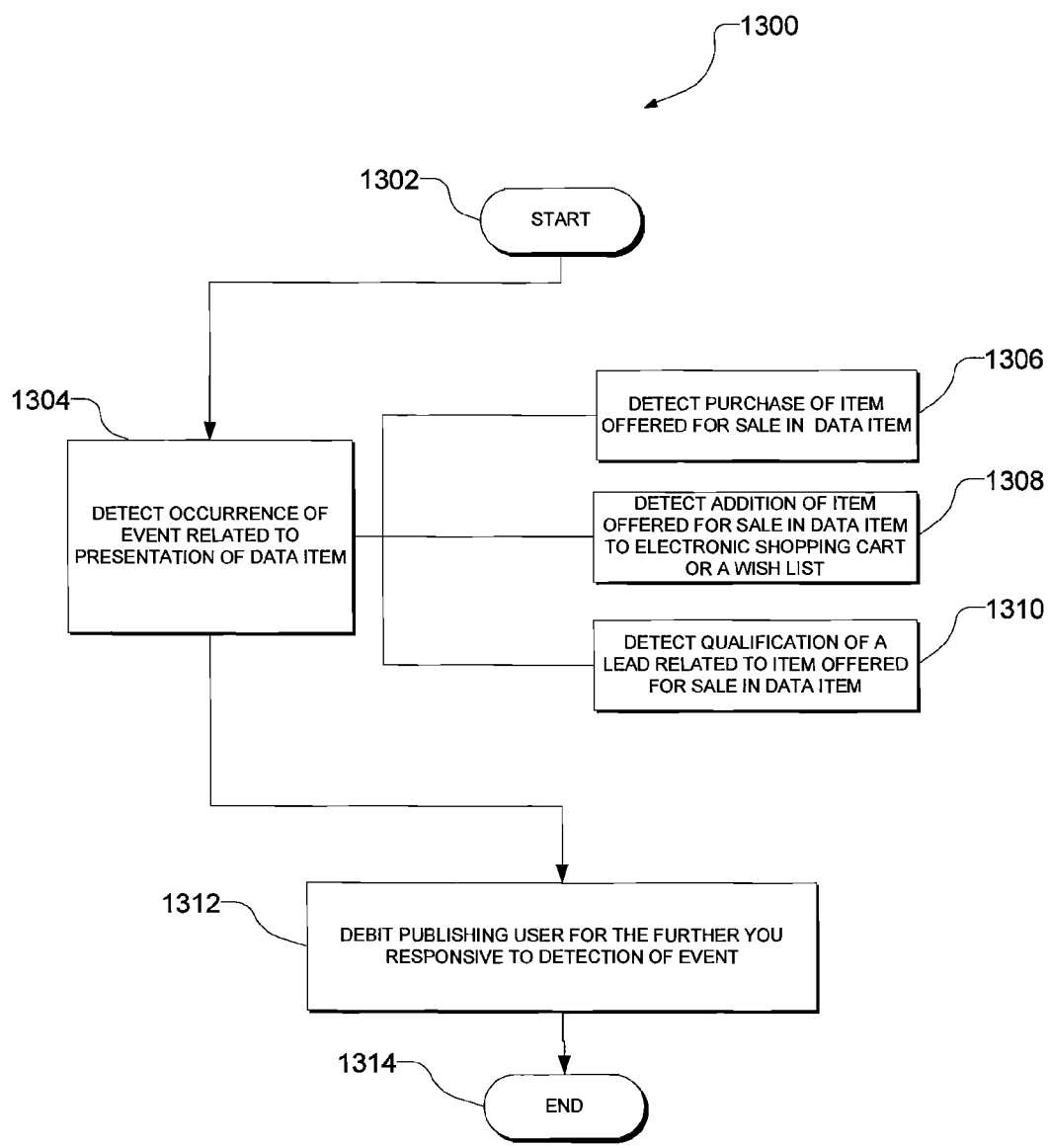
FIG. 13 is a flowchart illustrating a method, according to an example embodiment, to detect occurrence of an event, for example upon which payment of a success-based fee may be payable by a publishing user to a publishing system.

FIG. 13 is a flowchart illustrating a method 1300, according to an example embodiment, to detect occurrence of an event, for example upon which payment of a success-based fee may be payable by a publishing user to a publishing system. For example, where the publishing system is part of an online marketplace, the method 1300 may be deployed to detect an event at which a seller would become liable for a success-based fee (e.g., a bid) submitted by the seller with respect to a featured promotion (or other promotion) of a listing of the seller.

In an example embodiment, the method 1300 may be performed by an event detection system 252, as illustrated in FIG. 2.

The method 1300 commences at 1302 and progresses to operation 1304 with the detection, by the event detection system 252, of the occurrence of an event that is related to the presentation of a data item. The detection at operation 1304 may include, for example, detecting, at operation 1306, purchase of an item (or delivery of a service) offered for sale related to a presentation (e.g., published, or promoted) a data item.

The detection at operation 1304 may further include addition of an item offered for sale in a data item to an electronic shopping cart, or a wish list, or a tagging or flagging of interest, by a user, in the relevant data item in some other manner. The detection of the occurrence may also include detecting qualification of a lead related to an item offered for sale in the data item.

It will be appreciated that the events described as being detected at operations 1306-1310 are merely examples, and any one of a number of actions with respect to the presentation of the data item may be detected, such as a click-through, or some other user monitored action.

Having completed operation 1304, the method 1300 then progresses to operation 1312, where a checkout and payment system 232 may charge the publishing user responsive to the detection of the occurrence of the event. In one embodiment, the charge to the publishing user may be the success-based fee discussed above. The method 1300 then ends at operation 1314.

Figure 14:
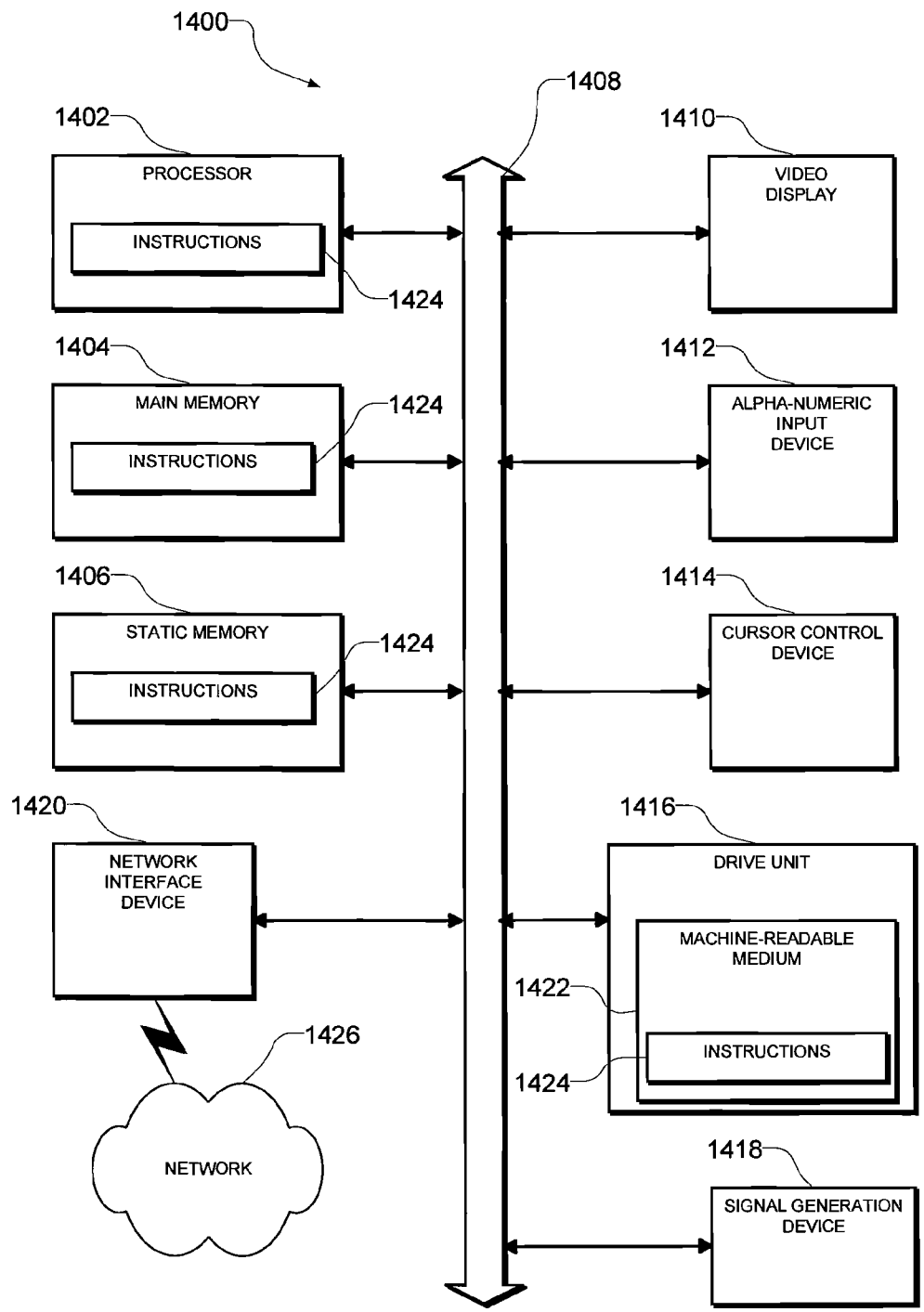
FIG. 14 shows a diagrammatic representation of machine in the example form of a computer system within which a set of instructions, for causing the machine to perform any one or more of the methodologies discussed herein, may be executed.

FIG. 14 shows a diagrammatic representation of machine in the example form of a computer system 1400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU) a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by the computer system 1400, the main memory 1404 and the processor 1402 also constituting machine-readable media.

The software 1424 may further be transmitted or received over a network 1426 via the network interface device 1420.

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, example methods and systems have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    capturing user interactions with a networked system with respect to a plurality of data items presented on the networked system, wherein the capturing of user interactions includes identifying and recording click streams and conversion events associated with the plurality of data items;
    generating historical data related to user behavior with respect to the plurality of data items based on the click streams and conversion events included in the captured user interactions, wherein the generating of the historical data includes detection of trends in the captured user interactions;
    implementing a hierarchical category structure of the plurality of data items in which the hierarchical category structure classifies the plurality of data items;
    identifying matching data items of the plurality of data items that match keywords of a query at a search component of a processing device based on a relationship between the keywords and classification of the matching data items by the hierarchical category structure;
    determining a likelihood of occurrence of a particular action with respect to each matching data item based on the trends included in the historical data related to user behavior;
    determining, at a value component of the processing device, a presentation value for each respective matching data item, the presentation value of a respective matching data item being based on the determined likelihood of occurrence of the particular action associated with the respective matching data item and being based on a value associated with the respective matching data item given by a respective first user for publication of the respective matching data item that affects presentation of the respective matching data item on a user interface by a publication system;
    ranking, at a ranking component of the processing device, the matching data items for presentation to a second user based on the presentation value for each matching data item;
    based on the ranking, identifying, using a hardware processor, a subset of matching data items to be featured in a featured items portion of the user interface, the user interface comprising the featured items portion and a search result portion separate from and adjacent to the featured items portion; and
    causing presentation of the subset of matching data items to be visually distinguished from the other matching data items by being featured in the featured items portion and causing presentation of the other matching data items that match the keywords in the search result portion of the user interface on a user device of the second user.

2. The method of claim 1, further comprising receiving a query via the user interface on the user device of the second user, wherein the causing presentation comprises updating the user interface on the user device of the second user.

3. The method of claim 1, wherein the publication system is a marketplace system, and the plurality of data items comprises a plurality of listings published by the marketplace system.

4. The method of claim 1, wherein the publication system is an advertisement system, and the plurality of data items comprises a plurality of advertisements.

5. The method of claim 1, further comprising receiving, from the respective first user, the presentation value associated with the respective matching data item.

6. The method of claim 5, wherein the presentation value is an upfront fee paid by the respective first user to the publication system.

7. The method of claim 5, wherein the presentation value is a commitment by the respective first user to make a monetary payment to the publication system contingent upon an occurrence of a predetermined event.

8. The method of claim 7, wherein the predetermined event is an action performed with respect to the respective matching data item by the second user, the action includes at least one of a viewing action with respect to the respective matching data item, a navigation action with respect to the respective matching data item, or a purchase action with respect to the respective matching data item.

9. A method comprising:
    capturing user interactions with a networked system with respect to a plurality of data items presented on the networked system, wherein the capturing of user interactions includes identifying and recording click streams and conversion events associated with the plurality of data items;
    generating historical data related to user behavior with respect to the plurality of data items based on the click streams and conversion events included in the captured user interactions, wherein the generating of the historical data includes detection of trends in the captured user interactions;
    identifying matching data items of the plurality of data items that match keywords of a query at a search component of a processing device based on a relationship between the keywords and classification of the matching data items;
    determining a likelihood of occurrence of a particular action with respect to each matching data item based on the trends included in the historical data related to user behavior;
    determining, at a value component of the processing device, a presentation value for each respective matching data item, the presentation value of a respective matching data item being based on the determined likelihood of occurrence of the particular action associated with the respective matching data item and being based on a value associated with the respective matching data item given by a respective first user for publication of the respective matching data item that affects presentation of the respective matching data item on a user interface by a publication system;

ranking, at a ranking component of the processing device, the matching data items for presentation to a second user based on the presentation value for each matching data item;

based on the ranking, identifying, using a hardware processor, a subset of matching data items to be featured on a user interface; and causing presentation of the subset of matching data items to be visually distinguished from other matching data items by being featured in promotional slots that form a scrolling slide show on the user interface of a user device of the second user in which the promotional slots are separate from a search result portion that includes the other matching data items.

10. The method of claim 9, further comprising receiving a query via the user interface of the user device of the second user, wherein the causing presentation comprises updating the user interface of the user device of the second user.

11. The method of claim 9, further comprising causing presentation of directional buttons, the directional buttons being selectable by the second user to scroll the slide show.

12. The method of claim 9, wherein the publication system is a marketplace system, and the plurality of data items comprises a plurality of listings published by the marketplace system.

13. The method of claim 9, wherein the publication system is an advertisement system, and the plurality of data items comprises a plurality of advertisements.

14. The method of claim 9, further comprising receiving, from the respective first user, the presentation value associated with the respective matching data item.

15. The method of claim 14, wherein the presentation value is an upfront fee paid by the respective first user to the publication system.

16. The method of claim 14, wherein the presentation value is a commitment by the respective first user to make a monetary payment to the publication system contingent upon an occurrence of a predetermined event.

17. The method of claim 16, wherein the predetermined event is an action performed with respect to the respective matching data item by the second user, the action includes at least one of a viewing action with respect to the respective matching data item, a navigation action with respect to the respective matching data item, or a purchase action with respect to the respective matching data item.

18. A publication system comprising:
one or more hardware processors; and
one or more computer-readable storage media having instructions stored thereon that in response to being executed by the one or more hardware processors, cause the system to perform operations, the operations comprising:
capturing user interactions with a networked system with respect to a plurality of data items presented on the networked system, wherein the capturing of user interactions includes identifying and recording click streams and conversion events associated with the plurality of data items;

generating historical data related to user behavior with respect to the plurality of data items based on the click streams and conversion events included in the captured user interactions, wherein the generating of the historical data includes detection of trends in the captured user interactions;

identifying matching data items of the plurality of data items that match keywords of a query based on a relationship between the keywords and classification of the matching data items by a hierarchical category structure;

determining a likelihood of occurrence of a particular action with respect to each matching data item based on the trends included in the historical data related to user behavior;

determining a presentation value for each matching data item, the presentation value of a respective matching data item being based on the determined likelihood of occurrence of the particular action associated with the respective matching data item and being based on a value associated with the respective matching data item given by a respective first user for publication of the respective matching data item that affects presentation of the respective matching data item on a user interface by a publication system;

ranking the matching data items for presentation to a second user based on the presentation value for each matching data item; and based on the ranking, identifying a subset of matching data items to be featured in a featured items portion of the user interface that is separate from a search result portion; and causing presentation of the subset of data items to be featured in the featured items portion such that the subset of data items are visually distinguished from other matching data items that are included in the search result portion.

19. The system of claim 18, wherein:
the user interface comprises the featured items portion and the search result portion adjacent to the featured items portion, and
the presentation component is further to cause presentation of other matching data items in the search result portion of the user interface on a user device of the second user.

20. The system of claim 18, wherein the featured items portion comprises promotional slots that form a scrolling slide show on the user interface of a user device of the second user.

* * * * *